United States Patent
Mandal et al.

(10) Patent No.: US 6,615,218 B2
(45) Date of Patent: *Sep. 2, 2003

(54) DATABASE FOR EXECUTING POLICIES FOR CONTROLLING DEVICES ON A NETWORK

(75) Inventors: Kallol Mandal, Fremont, CA (US); Caveh F. Jalali, Redwood City, CA (US); Prashant Ramarao, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/118,949

(22) Filed: Jul. 17, 1998

(65) Prior Publication Data

US 2002/0138459 A1 Sep. 26, 2002

(51) Int. Cl.[7] ............................. G06F 17/00; G06F 7/00
(52) U.S. Cl. ..................... 707/102; 707/10; 709/224
(58) Field of Search ............................. 709/223–224, 709/226; 707/102, 5, 9

(56) References Cited

U.S. PATENT DOCUMENTS

| | | | | |
|---|---|---|---|---|
| 5,063,523 A | * | 11/1991 | Vrenjak | 709/223 |
| 5,295,244 A | * | 3/1994 | Dev et al. | 345/853 |
| 5,765,153 A | | 6/1998 | Benantar et al. | 707/9 |
| 5,787,437 A | * | 7/1998 | Potterveld et al. | 707/103 |
| 5,797,128 A | | 8/1998 | Birnbaum | 707/5 |
| 5,835,720 A | * | 11/1998 | Nelson et al. | 709/224 |
| 5,872,928 A | | 2/1999 | Lewis et al. | 709/222 |
| 5,889,953 A | | 3/1999 | Thebaut et al. | 709/221 |
| 6,014,700 A | * | 1/2000 | Bainbridge et al. | 709/226 |
| 6,061,448 A | * | 5/2000 | Smith et al. | 380/282 |
| 6,289,017 B1 | * | 9/2001 | Shani et al. | 370/395.53 |

OTHER PUBLICATIONS

David A. Taylor, Object–Oriented Information Systems: Planning and Implementation, John Wiley & Sons, Inc. 1992, pp. 1–33.*

James D. Foley et al., Computer Graphics Principles and Practice, Addison–Wesley Publishing Company, 1990, pp. 42–43.*

Gio Wiederhold, Database Design, 1983, McGraw–Hill Book Company, p. 477.*

* cited by examiner

Primary Examiner—Greta Robinson
Assistant Examiner—Susan F. Rayyan
(74) Attorney, Agent, or Firm—Park, Vaughan & Fleming LLP

(57) ABSTRACT

A database that can store static and dynamic entries, wherein a static entry contains conventional static data, and a dynamic entry contains information specifying dynamic behavior to control devices on a network. In this database, the act of storing a dynamic entry in the database triggers control over devices on the network. More specifically, one embodiment of a database system according to the present invention includes a data storage medium for storing entries as well as an indexing structure for locating entries on the data storage medium. It also includes a storage mechanism for performing operations to store entries on the data storage medium. Encoded on the data storage medium are dynamic entries containing descriptions of dynamic behavior for the devices on the network. The database additionally includes an execution mechanism that, in response to a dynamic entry being stored on the data storage medium, commands the devices on the network to perform the dynamic behavior specified in the dynamic entry. In a variation on the above embodiment, the execution mechanism is configured to periodically monitor and control the devices on the network.

18 Claims, 6 Drawing Sheets

DATABASE FOR EXECUTING POLICIES FOR CONTROLLING DEVICES ON A NETWORK

RELATED APPLICATION

The subject matter in this application is related to the subject matter in U.S. patent application Ser. No. 09/118,361, filed Jul. 17, 1998.

BACKGROUND

1. Field of the Invention

The present invention relates to controlling devices across a computer network. More specifically, the present invention relates to providing an infrastructure that allows a user to specify a policy to govern the operation of devices coupled to a computer network.

2. Related Art

In addition to facilitating communications between computer systems, computer networks are increasingly being used to facilitate communications between computer systems and electrical or mechanical devices such as network routers, printers, facsimile machines, PBX systems, photocopiers and audio/visual equipment. For example, computer networks make it possible for computer systems to control and coordinate the actions of switching equipment in a PBX system, or to remotely control the operation of a routers in a computer network.

However, the mechanisms being used to control such devices are presently very unsophisticated, which creates a number of problems for a system operator desiring to control a group of devices. First, devices are typically controlled by sending low-level device-specific commands to the devices. Thus, in order to control such devices a system operator must learn these low-level device-specific commands. Second, devices are typically controlled individually. Hence, in order to control a group of devices, a system operator must explicitly send commands to individual devices in the group. This can be a time-consuming process. Third, different devices are typically controlled through different management interfaces. Hence, a system operator must use a number of different management interfaces to operate a group of devices. Finally, present systems do not provide automated mechanisms to control and monitor the actions of devices. Consequently, a system operator must manually monitor and control the devices in order to accomplish a task requiring periodic monitoring and control.

What is needed is a system that provides high-level control over a group of devices coupled to a computer network.

SUMMARY

A database according to the present invention can store static and dynamic entries. A static entry contains conventional static data, whereas a dynamic entry contains information specifying dynamic behavior to control devices on a network. The act of storing a dynamic entry in the database triggers control over devices on the network. More specifically, one embodiment of a database system according to the present invention includes a data storage medium for storing entries as well as an indexing structure for locating entries on the data storage medium. It also includes a storage mechanism for performing operations to store entries on the data storage medium. Encoded on the data storage medium are dynamic entries containing descriptions of dynamic behavior for the devices on the network. The database additionally includes an execution mechanism that, in response to a dynamic entry being stored on the data storage medium, commands the devices on the network to perform the dynamic behavior specified in the dynamic entry. In a variation on the above embodiment, the execution mechanism is configured to periodically monitor and control the devices on the network.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of System

Figure 1:
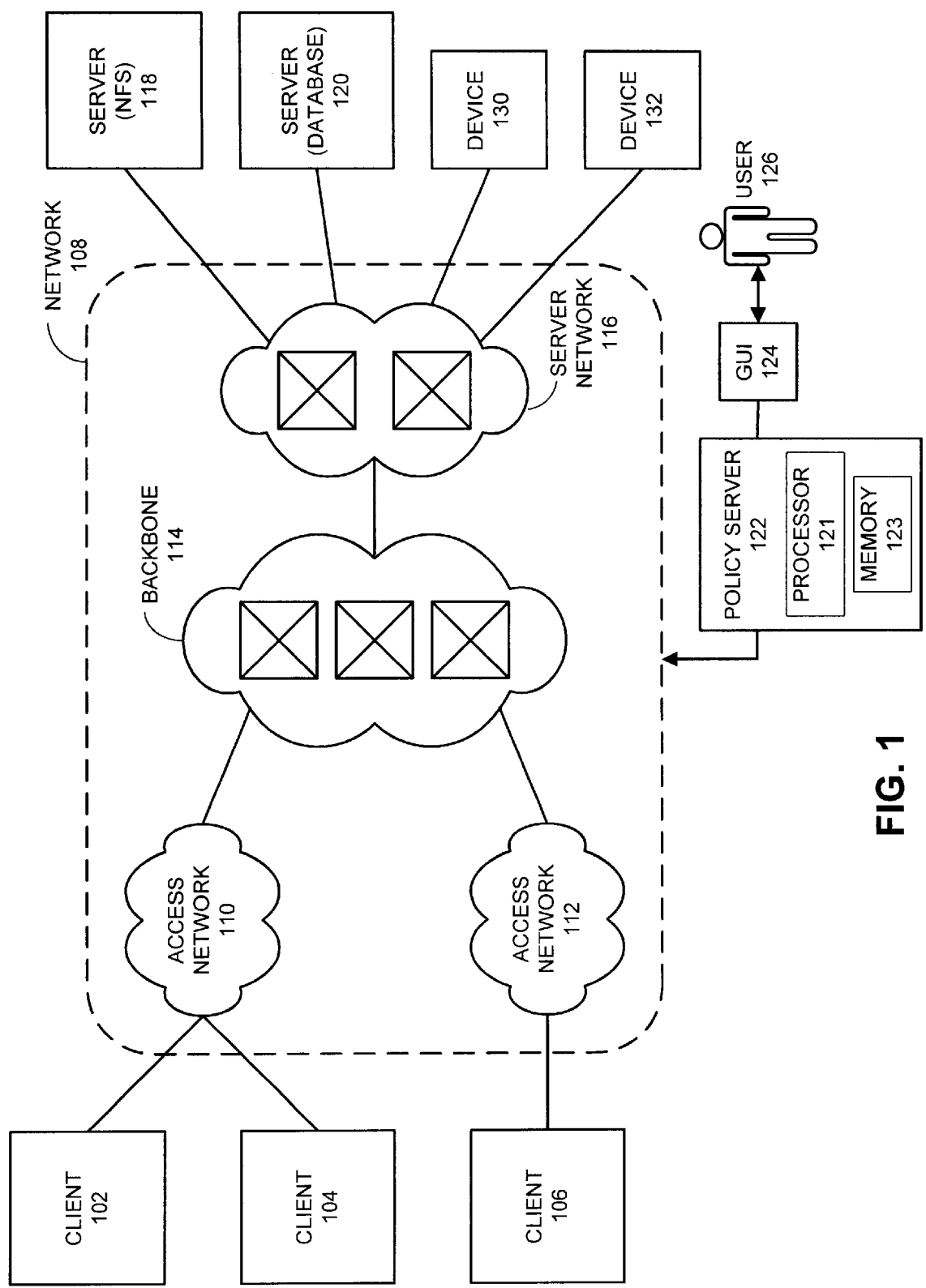
FIG. 1 illustrates a system including computers and devices coupled together through a network in accordance with an embodiment of the present invention.

FIG. 1 illustrates a system including computers and devices coupled together through a network 108 in accordance with an embodiment of the present invention. The system illustrated in FIG. 1 includes network 108, which is coupled to clients 102, 104 and 106 as well as servers 118 and 120. Network 108 is additionally coupled to devices 130 and 132 and policy server 122.

Network 108 generally refers to any type of wire or wireless link between computers and devices, including, but not limited to, a local area network, a wide area network, or a combination of networks. In one embodiment of the present invention, network 108 includes the Internet. In the embodiment illustrated in FIG. 1, network 108 includes backbone 114, server network 116 and access networks 110 and 112.

Access networks 110 and 112 may include any type of network that can be used to couple client computing systems 102, 104 and 106 with network 108. This includes, but is not limited to local area networks. More specifically, access network 110 couples clients 102 and 104 with backbone 114, and access network 112 couples client 106 to backbone 114.

Backbone 114 includes switching and routing devices that facilitate communications between server network 116 and access networks 110 and 112. This includes, but is not limited to, local area networks and wide area networks. For example, backbone 114 may include the Internet. The switching and routing devices in backbone 114 are denoted by boxes containing X's, and can be controlled by commands sent from computer systems coupled to network 108.

Server network 116 couples backbone 114 with servers 118 and 120 as well as devices 130 and 132. Server network 116 similarly contains switching and routing devices denoted by boxes containing X's that can be controlled by commands from computer systems coupled to network 108. Server network 116 may be any type of network coupled to a server computer system. For example, server network 116 may include a network supported by an Internet Service Provider (ISP).

Clients 102, 104 and 106 may include any node on a computer network including computational capability and including a mechanism for communicating across network 108. For example, clients 102, 104 and 106 may include a Java™ workstation or a personal computer running an Internet browser.

Servers 118 and 120 may include any node on a computer network including computational capability, and possibly data storage capability, as well as a mechanism for servicing requests from clients for computational or data storage resources. More specifically, server 118 is a file server that services requests for file accesses using the Network File System (NFS) protocol, and server 120 is a database server that services requests for database operations.

Devices 130 and 132 may include any device that can be controlled by commands sent over a computer network. This includes, but is not limited to, a printer, a facsimile machine, a PBX telephone exchange, a photocopier, or audio/visual equipment, such as a digital camera. Note that although devices 130 and 132 are illustrated as being coupled to server network 116, they may generally be coupled to any location on network 108.

Policy server 122 receives commands from user 126 through Graphical User Interface (GUI) 124, and uses these commands to control the actions of devices coupled to network 108. As illustrated in FIG. 1, policy server 122 includes processor 121 and memory 123, which are used to carry out the actions of policy server 122.

The system illustrated in FIG. 1 operates as follows. First, user 126 inputs commands into GUI 124; these commands specify a high-level policy for controlling actions of devices 130 and 132. For example, a policy may specify that a temperature control system should keep a portion of a building at a certain temperature. Another policy may specify that a network management system should allow no more than 30% of total bandwidth for video traffic. Yet another policy may specify that a network management system should give higher priority to traffic on a LAN that originates from a finance server at the end of a quarter. Next, policy server 122 receives these commands and translates them into low-level device-specific commands that are sent to devices 130 and 132 across network 108. Note that policy server 122 may additionally be used to control switching and routing devices within backbone 114 and server network 116.

Description of Policy Server

Figure 2:
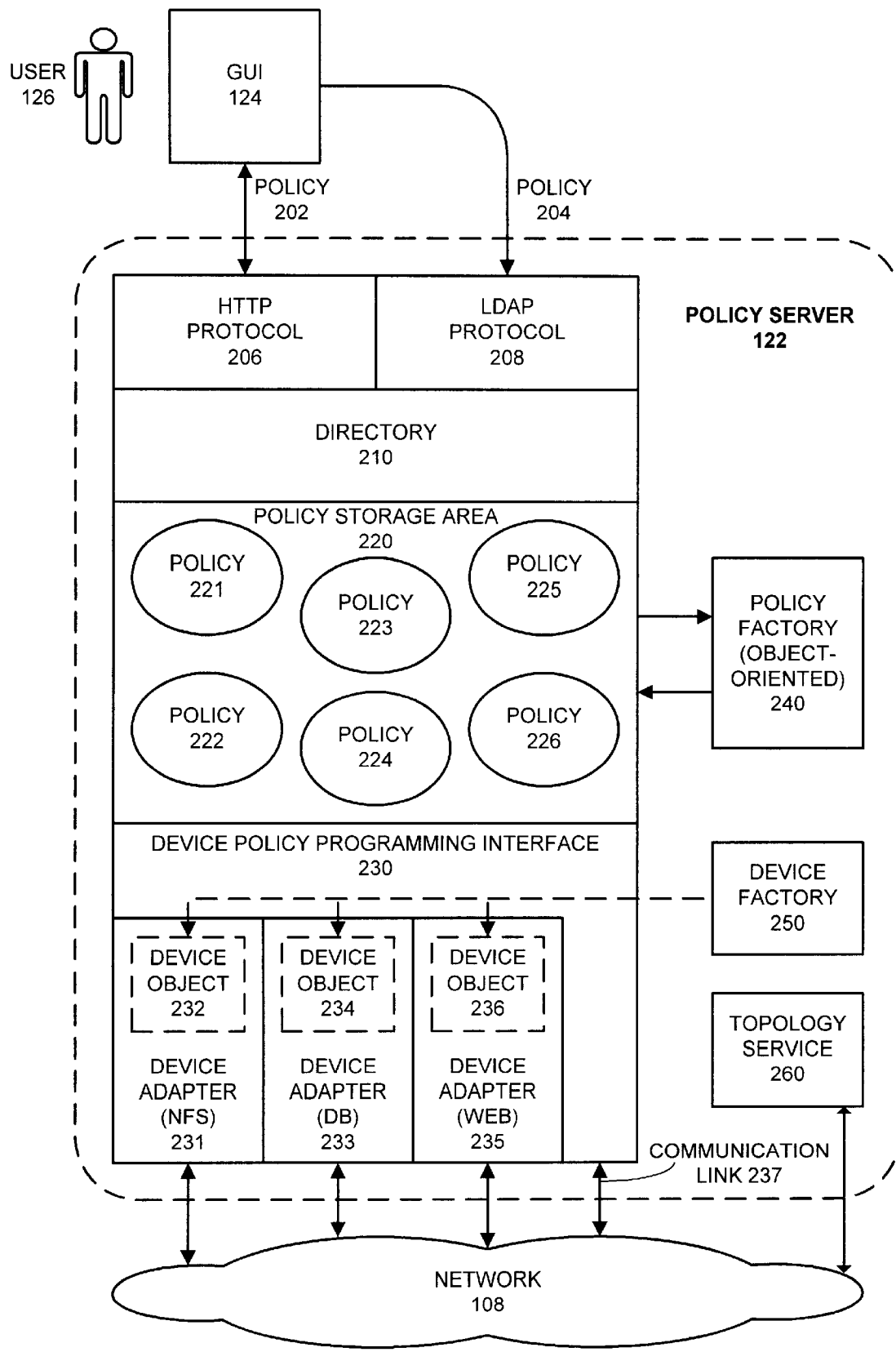
FIG. 2 illustrates the internal structure of a policy server for controlling devices on a network in accordance with an embodiment of the present invention.

FIG. 2 illustrates the internal structure of a policy server 122 from FIG. 1 in accordance with an embodiment of the present invention. As in FIG. 1, policy server 122 receives policies from user 126 through GUI 124. These policies are translated into lower-level device specific commands that are sent over network 108 to devices 130 and 132 (illustrated in FIG. 1). Policy server 122 receives requests to create policies 202 and 204, through HTTP protocol interface 206, or LDAP protocol interface 208. HTTP protocol interface 206 contains computational resources to decipher commands in the HTTP protocol. LDAP protocol interface 208 contains computational resources for deciphering commands in the LDAP protocol.

Policy server 122 additionally contains directory 210, which is a data storage area that can be used to store dynamic entries, which specify parameters for different policies. In one embodiment of the present invention, directory 210 additionally stores conventional static database entries containing static data.

Storing a dynamic entry in directory 210 causes policy factory 250 to create a corresponding policy object, which is stored in policy storage area 220. In the illustrated embodiment, policy storage area 220 contains policy objects 221, 222, 223, 224, 225 and 226. In one embodiment of the present invention these policy objects includes objects defined within an object-oriented programming system, which include data and methods that can be invoked to implement the associated policy.

Policy objects 221, 222, 223, 224, 225 and 226 communicate with devices through device Policy Programming Interface (device PPI) 230. Device PPI 230 provides a uniform interface for communicating with devices across network 108. To this end, device PPI 230 includes a number of adapters for communicating with different devices using device-specific protocols. In general, device PPI 230 includes a different adapter for each different type of device it communicates with. More particularly, device PPI 230 includes: device adapter 231 for communicating with NFS devices; device adapter 233 for communicating with database devices; and device adapter 235 for communicating with web server devices. As illustrated in FIG. 2, device PPI 230 can additionally communicate directly across network 108 through communication link 236.

Device adapters 231, 233 and 235 include device objects 232, 234 and 236, respectively. Device objects 232, 234 and 236 contain data and methods that can be used to communicate with associated devices over network 108. These device objects are created by device factory 250 as is described below.

Policy server 122 additionally includes topology service 260, which keeps track of the devices and computing nodes that are coupled to network 108. This information allows policies within policy server 122 to adapt to changes in the topology of network 108.

Description of Database System

Figure 3:
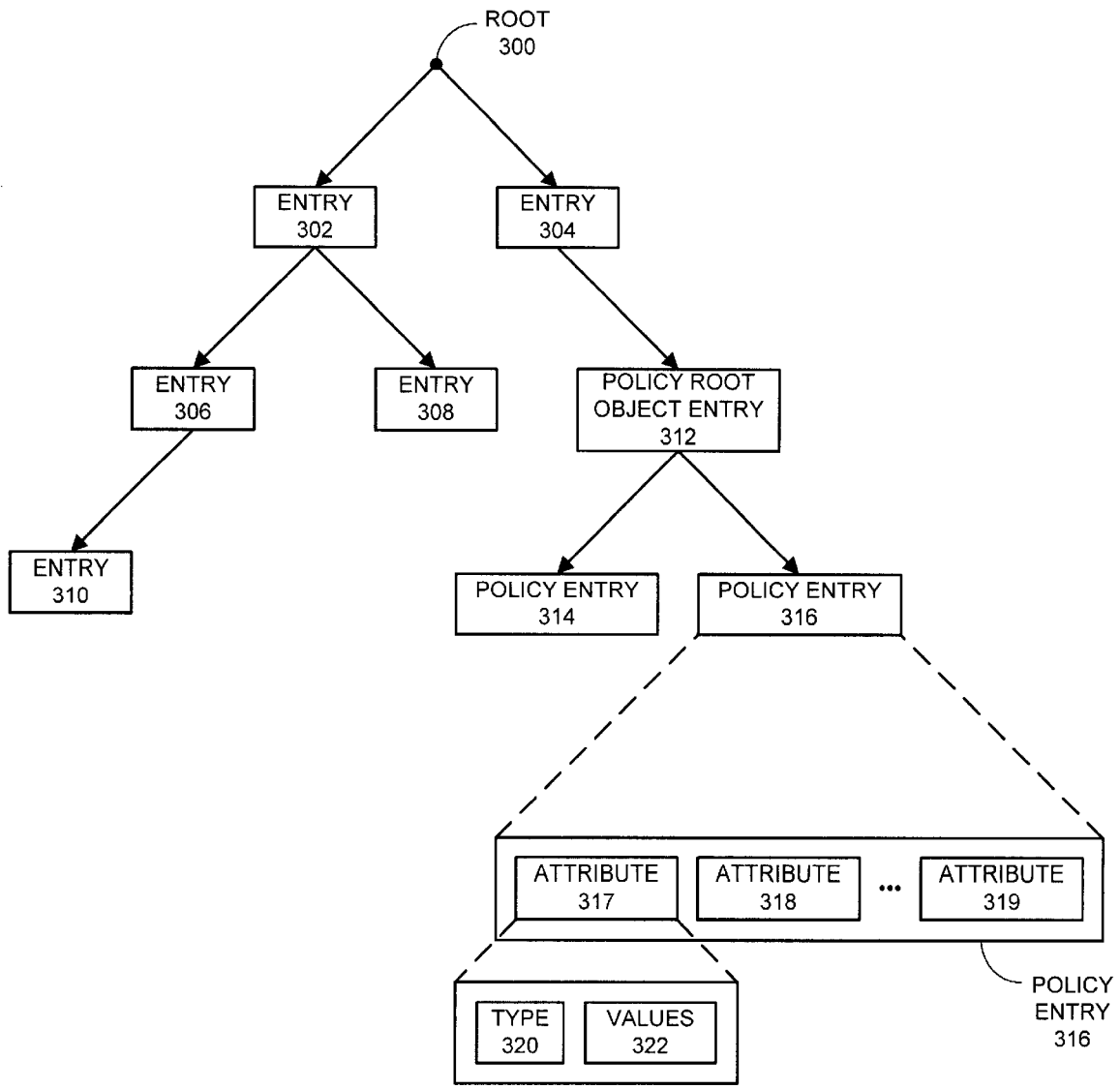
FIG. 3 illustrates the internal structure of a database system that stores dynamic entries specifying actions for devices on a network in accordance with an embodiment of the present invention.

FIG. 3 illustrates a database system that stores dynamic entries specifying actions of devices on network 108 in accordance with an embodiment of the present invention. In one embodiment of the present invention, this database system is used to implement directory 210 from FIG. 2. The information stored in the directory is composed of directory of entries. Each entry is made up of attributes, wherein each attribute includes a type and one or more values. The type of attribute that is present in a particular entry is dependent on the class of object the entry describes.

FIG. 3 illustrates a directory structured in the form of a tree, with vertices representing the entries. Entries higher in the tree (nearer the root) represent objects such as countries or organizations, whereas entries lower in the tree represent people or application-specific objects. Entries can include a distinguished name, which uniquely identifies the entry. The distinguished name of an entry could be made up of the distinguished name of its superior entry together with specially nominated attribute values from the entry.

In one embodiment of the present invention, the Lightweight Directory Access Protocol (LDAP) is used the access the directory. The LDAP directory enforces a set of rules to ensure that the database remains well-formed in the face of modifications over time. These rules, known as the LDAP directory schema, prevent an entry from having the wrong types of attributes for its object class. They also prevent attribute values from being of the wrong form for the attribute type, and even prevent entries from having subordinate entries of the wrong class.

In order to implement the present invention, the LDAP directory is extended to contain statements of dynamic behavior about devices coupled to network 108. These statements of dynamic behavior are referred to as policies. Entries that represent policies are different from conventional directory entries in that they have a special class or schema definition to represent them. An LDAP directory entry that includes a policy requires more than standard functions for storage and retrieval. It requires a function that takes actions that are dictated by the attributes of the policy entry.

As is illustrated in FIG. 3, the directory structure includes a root node 300, which is coupled to entries 302 and 304. Entry 302 is coupled to entries 306 and 308. Entry 306 is coupled to entry 310. These entries contain conventional static data. More importantly, entry 304 is coupled to policy root object 312. Policy root object 312 forms the root of a tree that contains policy entries. In the example illustrated in FIG. 3, policy root object 312 is coupled to policy entries 314 and 316.

As illustrated in FIG. 3, policy entry 316 includes attributes 317, 318 and 319. Each policy attribute contains a type and values. For example, policy attribute 317 includes type 320 and values 322.

Description of Policy Creation Process

Figure 4:
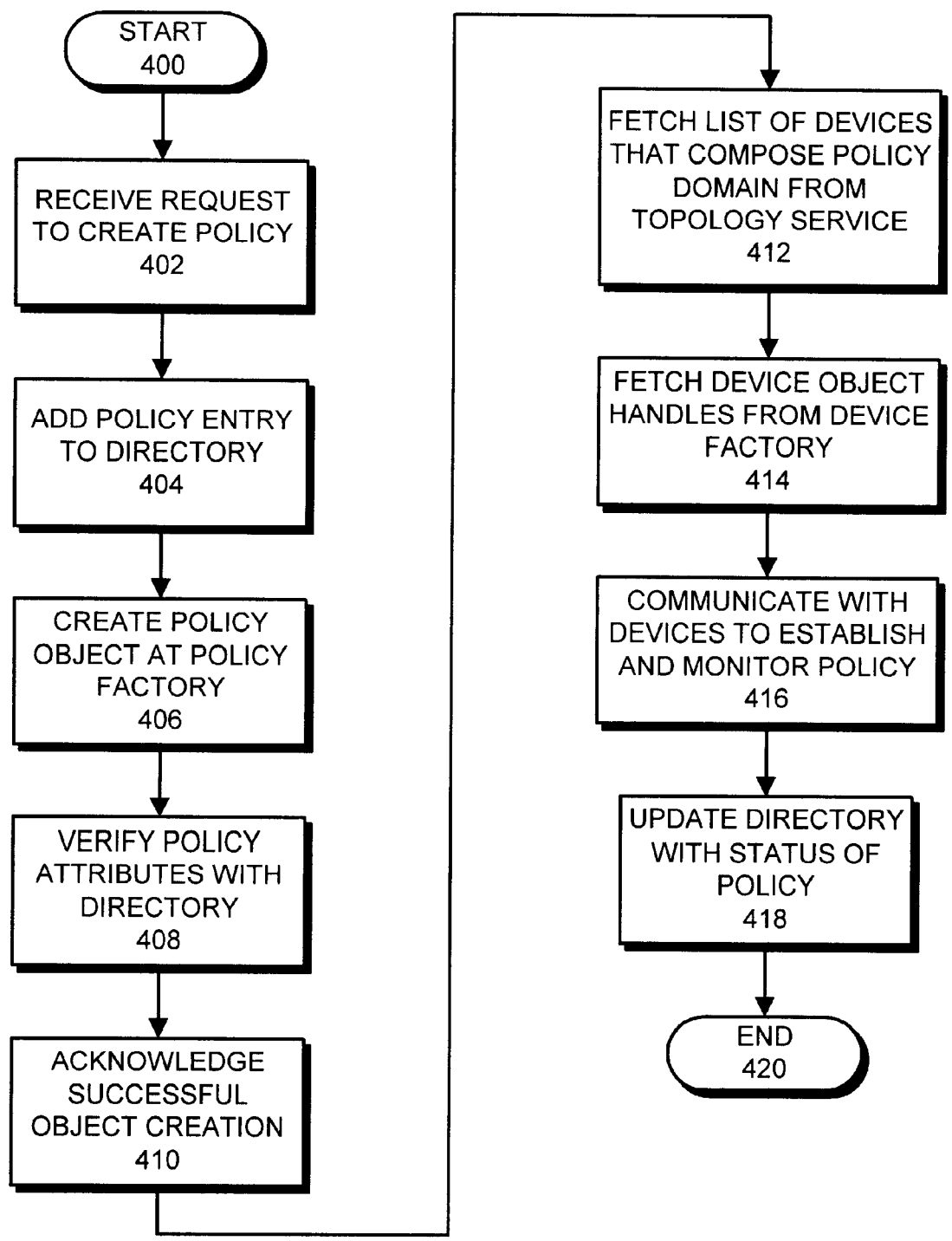
FIG. 4 is a flow chart illustrating the process of creating a policy for controlling devices on a network in accordance with an embodiment of the present invention.

FIG. 4 is a flow chart illustrating the process of creating a policy for controlling devices in accordance with an embodiment of the present invention. The process starts when the system receives a request to create a policy (state 402). In one embodiment of the present invention, the request is received from user 126 who inputs the request into a web browser operating on GUI 124. The request can be received in a number of ways. In one embodiment of the present invention, the system receives the policy creation request through HTTP protocol interface 206. In another embodiment of the present invention, the system receives the request through LDAP protocol interface 208.

The system next adds an entry for the requested policy in directory 210 within policy server 122 (state 404). This entry contains attributes specifying the policy. Next, a corresponding policy object is created by policy factory 240 (state 406), and the policy object is stored in policy storage area 220. This policy object contains data and methods for controlling devices on network 108 to implement the policy. In one embodiment of the present invention, the object is created within the Java™ programming language based upon the Java™ class path of the policy.

Next, the policy object performs a lookup in directory 210 to verify that the object has been created consistently with the associated parameters contained within the corresponding entry in directory 210 (state 408). Next, the object acknowledges that it has been created successfully by sending a message to user 126 through GUI 124 (state 410).

The policy object next fetches a list of devices that compose the policy domain from topology service 260 (state 412). Topology service 260 maintains status information for the active devices coupled to the network by either periodically polling devices on network 108, or by merely listening to traffic on network 108 to determine which devices are responding to commands, and are hence, "active." During this process, topology service 260 updates the corresponding policy entry in directory 210 to reflect and changes in the policy domain. Once the policy object knows the status of devices, it can select devices to implement the policy from the policy domain.

In order to communicate with and command the devices, the policy object fetches device object handles from device factory 250 (state 414). Next, the policy object uses the device object handles to communicate with the devices in order to establish and monitor the policy according to the policy schedule (state 416). This involves communicating with the devices through device PPI 230 and device objects 232, 234 and 236, as well as device adapters 231, 233 and 235.

Note that policy server 122 includes a communication link 237 to network 108 in addition to links through device adapters 231, 233 and 235.

Finally, the policy object updates its corresponding entry in directory 210 to indicate the status of the policy (state 418). This information includes a list of the devices involved in implementing the policy as well as status information for the devices and the policy. This updating process occurs periodically while the policy is executing, so that the corresponding entry in directory 210 is continually updated.

The above states are repeated for each additional policy object that is created by the system illustrated in FIG. 2.

Description of Policy Modification Process

Figure 5:
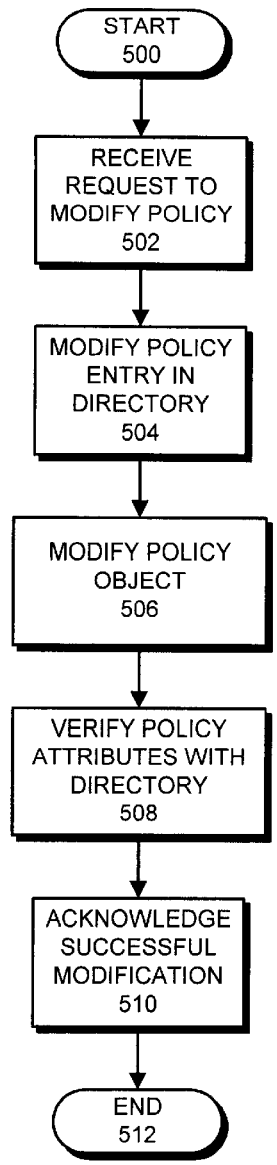
FIG. 5 is a flow chart illustrating the process of modifying a policy in accordance with an embodiment of the present invention.

FIG. 5 is a flow chart illustrating the process of modifying an existing policy in accordance with an embodiment of the present invention. The process starts when the system receives a request to modify an existing policy (state 502). In one embodiment of the present invention, the request is received from user 126 who inputs the request into a web browser operating on GUI 124. Next, the system modifies the entry for the policy within directory 210, so that the directory properly indicates the modified state of the policy (state 504). Next, the system modifies the policy object by sending a change request to policy factory 240 (state 506). Policy factory 240 relays this request to the policy object, which makes the requested change. Next, the policy object performs a lookup in directory 210 to verify that the policy object has been modified consistently with the associated parameters contained within the corresponding entry in directory 210 (state 508). Next, the policy object acknowledges that it has been modified successfully by sending a message to user 126 through GUI 124 (state 510). The above process is repeated whenever a policy is modified.

Description of Device Monitoring Process

Figure 6:
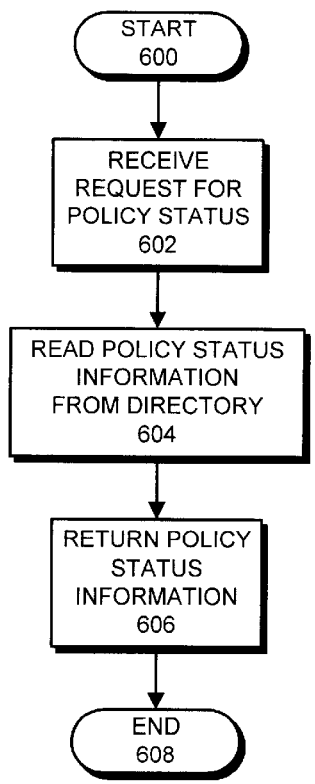
FIG. 6 is a flow chart illustrating the process of monitoring devices in accordance with an embodiment of the present invention.

FIG. 6 is a flow chart illustrating the process of monitoring devices involved in a policy in accordance with an embodiment of the present invention. The process starts when the system receives a request to monitor an existing policy (state 602). In one embodiment of the present invention, the request is received from user 126 who inputs the request into a web browser operating on GUI 124. Next, the system reads policy status information from the entry for the policy in directory 210 (state 604). Recall that the entry for the policy in directory 210 is periodically updated with status information regarding the policy. Next, the system returns the policy status information to the requestor. In one embodiment of the present invention, this status information is returned in the form of HTML data, which contains Java™ applets. These Java™ applets query the policy object for private policy status information. The above process is repeated whenever a request for policy status is received.

Description of Policy Deletion Process

Figure 7:
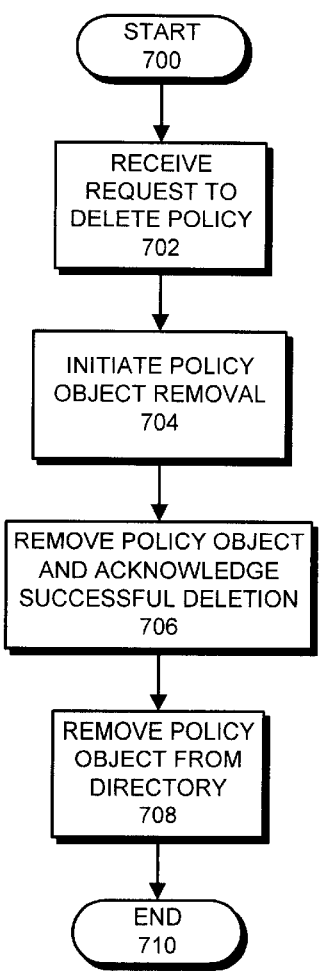
FIG. 7 is a flow chart illustrating the process of deleting a policy in accordance with an embodiment of the present invention.

FIG. 7 is a flow chart illustrating the process of deleting a policy in accordance with an embodiment of the present invention. The process starts when the system receives a request to delete an existing policy (state 702). In one embodiment of the present invention, the request is received from user 126 who inputs the request into a web browser operating on GUI 124. Next, the system initiates the removal process (state 704). This is accomplished by sending a removal request to policy factory 240. Policy factory 240 looks up the corresponding policy object and notifies the policy object that it is to be removed. The policy object then carries out the removal process and acknowledges that it has been successfully deleted by sending a message to user 126 through GUI 124 (state 706). Next, the system removes the entry for the policy from directory 210 (state 708). The above process is repeated whenever a policy is modified.

EXAMPLE

Figure 8:
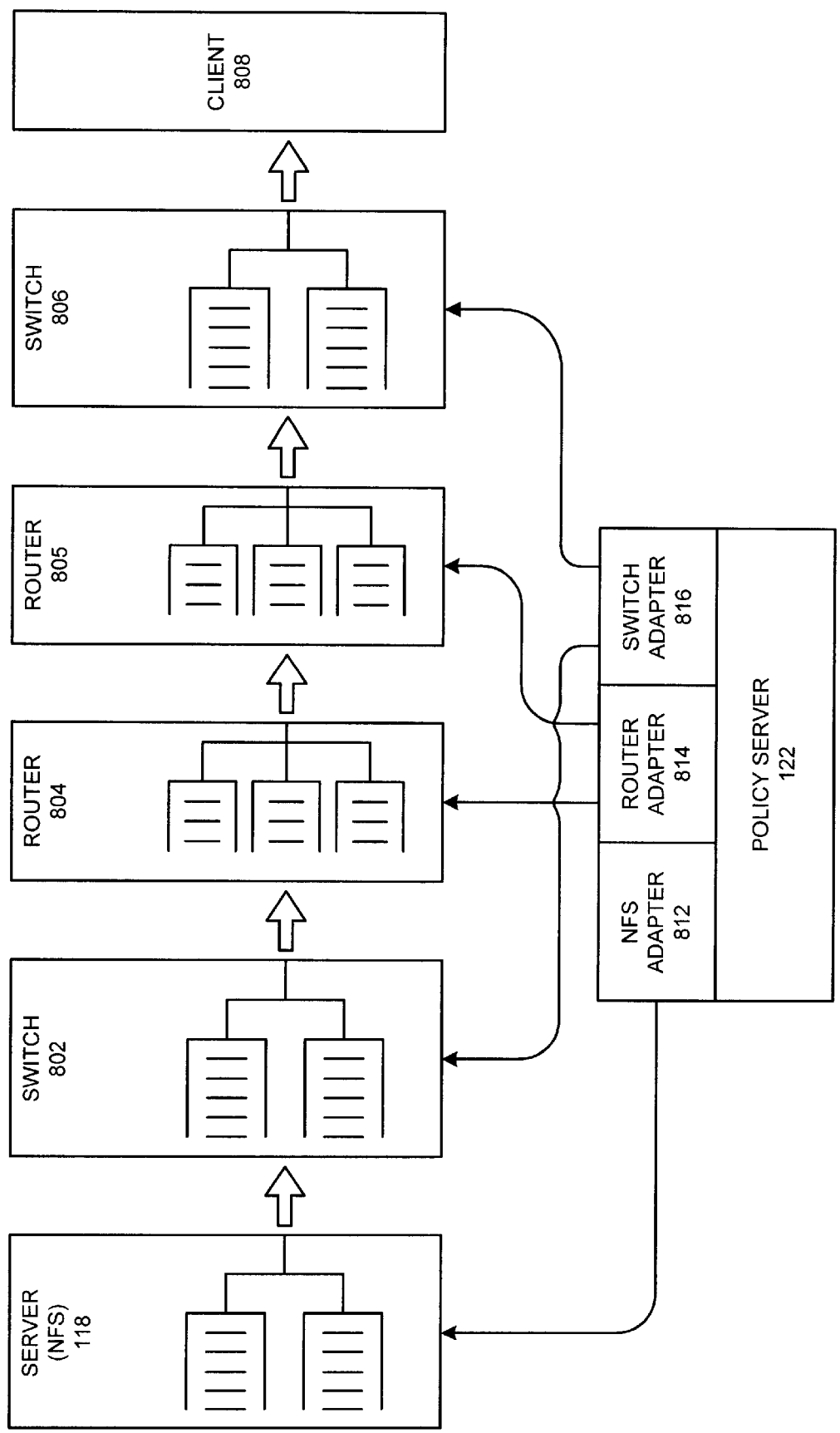
FIG. 8 is a block diagram illustrating an example of controlling devices that route data across a network in accordance with an embodiment of the present invention.

FIG. 8 is a block diagram illustrating the process of controlling devices that route data across a network in accordance with an embodiment of the present invention. In the example illustrated in FIG. 8, policy server 122 (from FIG. 1) controls the actions of a number of devices, including server 118, switch 802, router 804, router 805, switch 806 and client 808. Switches 802 and 806 forward packets at the medium access control level, and routers 804 and forward packets at the Internet protocol level for communications across network 108 in FIG. 1.

In order to communicate with the illustrated devices, policy server 122 includes a number of adapters, including NFS adapter 812 for communicating with server 118, router adapter 814 for communicating with routers 804 and 805, and switch adapter 816 for communicating with switches 802 and 806.

In the configuration illustrated in FIG. 1, policy server 122 can implement a number of policies related to controlling network traffic between server 118 and client 808. For example, one policy might be to reserve 5 megabits of bandwidth from server 118 to client 808. To implement this policy, policy server 122 sends commands to the illustrated devices from left to right in FIG. 8 starting at server 118 and proceeding to client 808. These commands specify that 5 megabits of bandwidth should be reserved for traffic between server 118 and client 808. The reason policy server 122 starts on the server side of the network is that network traffic tends to be concentrated nearer to file servers, and devices that are closer to the file servers tend to include more sophisticated mechanisms to manage traffic.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A database system, comprising:

a data storage medium, for storing entries in the database system;

an indexing structure that locates entries on the data storage medium;

a storage mechanism that stores entries on the data storage medium;

a dynamic entry, encoded on the data storage medium, that contains a description of dynamic behavior for at least one device on the network in order to implement a policy;

an execution mechanism that, in response to the dynamic entry being stored on the data storage medium, creates a corresponding policy object in a policy storage area, wherein the policy object contains data and methods that command the at least one device to perform a set of actions to produce the dynamic behavior specified in the dynamic entry; and a topology server that is configured to maintain status information for active devices coupled to the network by continually monitoring the status of devices coupled to the network;

wherein the execution mechanism is configured to monitor the at least one device on the network by communicating with the topology server; and wherein the execution mechanism is configured to send additional commands to the at least one device in order to implement the dynamic behavior for the at least one device on the network.

2. The database system of claim 1, further comprising a retrieval mechanism that retrieves entries from the data storage medium.

3. The database system of claim 1, further comprising at least one static entry, encoded on the data storage medium, that contains static data.

4. The database system of claim 1, wherein the storage mechanism includes at least one function specified in computer code for storing entries on the data storage medium.

5. The database system of claim 1, wherein the indexing structure is organized hierarchically.

6. The database system of claim 1, further comprising a command processing mechanism that is configured to receive commands using the Lightweight Directory Access Protocol (LDAP).

7. The database system of claim 1, wherein the dynamic entry contains an object defined within an object-oriented programming system that contains the description of the dynamic behavior for the devices on the network.

8. The database system of claim 1, wherein the devices include a router for routing traffic over the network.

9. A computer system for controlling devices on a network, comprising:

a processor;

a memory;

a network interface, coupled to the network;

a database system including a data storage medium for storing entries in the database system;

an indexing structure that locates entries in the data storage medium;

a storage mechanism that stores entries in the data storage medium;

a dynamic entry, encoded on the data storage medium, that contains a description of dynamic behavior for at least one device on the network in order to implement a policy;

an execution mechanism, within the processor, that, in response to the dynamic entry being stored on the data storage medium, creates a corresponding policy object in a policy storage area, wherein the policy object contains data and methods that command the at least one device to perform a set of actions to produce the dynamic behavior specified in the dynamic entry; and a topology server that is configured to maintain status information for active devices coupled to the network by continually monitoring the status of devices coupled to the network;

wherein the execution mechanism is configured to monitor the at least one device on the network by communicating with the topology server; and wherein the execution mechanism is configured to send additional commands to the at least one device in order to implement the dynamic behavior for the at least one device on the network.

10. A method for controlling devices on a network, comprising:

receiving an input to be stored in a database, the input including a description of dynamic behavior for the devices on the network;

storing the input as an entry in the database in order to implement a policy;

in response to the act of storing the input in the database, forming a corresponding policy object associated with the entry in the database in a policy storage area, wherein the policy object contains data and methods for controlling the at least one device on the network;

wherein the set of commands is encapsulated within the methods in the policy object;

transmitting the set of commands across the network to the at least one device so that the at least one device can perform the set of actions; and monitoring the at least one device on the network by using a topology server that is configured to maintain status information for active devices coupled to the network by continually monitoring the status of devices coupled to the network; and sending additional commands to the at least one device in order to implement the dynamic behavior for the at least one device on the network.

11. The method of claim 10, wherein the act of forming the set of commands includes creating an object defined within an object-oriented programming system, and storing the set of commands in the object.

12. The method of claim 11, wherein the act of storing the input as an entry in the database includes sending a request to store the entry in the database using the Lightweight Directory Access Protocol (LDAP).

13. The method of claim 10, wherein the database is indexed hierarchically.

14. The method of claim 10, wherein the act of forming the set of commands includes forming device-specific commands for controlling the devices on the network.

15. The method of claim 10, wherein the devices include a router for routing traffic over the network.

16. A method for controlling devices on a network, comprising:

receiving an input to be stored in a database, the input including a description of dynamic behavior for the devices on the network;

storing the input as an entry in the database in order to implement a policy;

in response to storing the input in the database, forming a set of device-specific commands for at least one device on the network to perform a set of actions specified in the description of dynamic behavior, wherein forming the set of device-specific commands includes creating a corresponding policy object defined within an object-oriented programming system that contains data and methods for controlling the at least one device on the network, and storing the set of device-specific commands within methods in the policy object;

transmitting the set of device-specific commands across the network to the at least one device so that the devices can perform the set of actions;

monitoring the at least one device on the network by using a topology server that is configured to maintain status information for active devices coupled to the network by continually monitoring the status of devices coupled to the network; and sending additional commands to the at least one device in order to implement the dynamic behavior for the at least one device on the network.

17. A computer readable storage medium storing instructions that when executed by a computer cause the computer to perform a method for controlling devices on a network, comprising:

receiving an input to be stored in a database, the input including a description of dynamic behavior for the devices on the network;

storing the input as an entry in the database in order to implement a policy;

in response storing the input in the database, forming a set of commands for at least one device on the network to perform a set of actions specified in the description of dynamic behavior;

forming a corresponding policy object associated with the entry in the database, wherein the policy object contains data and methods for controlling the at least one device on the network;

wherein the set of commands is encapsulated within the methods in the policy object;

transmitting the set of commands across the network to the at least one device so that the at least one device can perform the set of actions;

monitoring the at least one device on the network by using a topology server that is configured to maintain status information for active devices coupled to the network by continually monitoring the status of devices coupled to the network; and sending additional commands to the at least one device in order to implement the dynamic behavior for the at least one device on the network.

18. A computer instruction signal embodied in a carrier wave carrying instructions that when executed by a computer cause the computer to perform a method for controlling devices on a network, comprising:

receiving an input to be stored in a database, the input including a description of dynamic behavior for the devices on the network;

storing the input as an entry in the database in order to implement a policy;

in response storing the input in the database, forming a set of commands for at least one device on the network to perform a set of actions specified in the description of dynamic behavior;

forming a corresponding policy object associated with the entry in the database, wherein the policy object contains data and methods for controlling the at least one device on the network;

wherein the set of commands is encapsulated within the methods in the policy object;

transmitting the set of commands across the network to the at least one device so that the at least one device can perform the set of actions;

monitoring the at least one device on the network by using a topology server that is configured to maintain status information for active devices coupled to the network by continually monitoring the status of devices coupled to the network; and sending additional commands to the at least one device in order to implement the dynamic behavior for the at least one device on the network.

* * * * *